United States Patent [19]

Georgelos et al.

[11] Patent Number: 5,635,261
[45] Date of Patent: Jun. 3, 1997

[54] THERMOPLASTIC FILM INCORPORATING HIGH MELT INDEX RESINS

[75] Inventors: Paul N. Georgelos, Hickory Hills; Stanley Lustig, Park Forest, both of Ill.

[73] Assignee: Viskase Corporation, Chicago, Ill.

[21] Appl. No.: 419,061

[22] Filed: Oct. 10, 1989

[51] Int. Cl.$^6$ .................................... C08L 23/08
[52] U.S. Cl. .................... 428/35.4; 428/36.7; 428/475.8; 428/476.1; 428/518; 428/520; 428/822; 428/34.9; 383/113; 383/908
[58] Field of Search ...................... 428/349, 522, 428/520, 35.2, 34.9, 35.1, 35.4, 35.5, 36.91, 36.7, 335, 518, 475.8, 910, 476.1; 525/222, 240; 383/113, 908

[56] References Cited

U.S. PATENT DOCUMENTS

| | | | |
|---|---|---|---|
| 3,012,918 | 12/1961 | Schaar | 154/46 |
| 3,365,520 | 1/1968 | Foster | 260/597 |
| 3,402,223 | 9/1968 | Hollingsworth | 260/897 |
| 3,456,044 | 7/1969 | Pahlke | 264/25 |
| 3,707,590 | 12/1972 | Wigigns et al. | 264/95 |
| 3,734,843 | 5/1973 | Tubbs | 204/159.14 |
| 3,741,253 | 6/1973 | Brax et al. | 138/137 |
| 3,770,852 | 11/1973 | Hager et al. | 260/397 |
| 3,817,821 | 6/1974 | Gallini | 161/165 |
| 3,900,635 | 8/1975 | Funderburk, Jr. et al. | 428/213 |
| 3,932,693 | 1/1976 | Shaw et al. | 428/518 |
| 4,031,162 | 6/1977 | Brax et al. | 260/837 |
| 4,064,296 | 12/1977 | Bornstein et al. | 428/35 |
| 4,082,877 | 4/1978 | Shadle | 428/35 |
| 4,127,688 | 11/1978 | Bieler et al. | 428/36 |
| 4,167,433 | 9/1979 | Lakshmanan | 156/322 |
| 4,178,401 | 12/1979 | Weingerg et al. | 428/35 |
| 4,247,584 | 1/1981 | Widiger et al. | 428/35 |
| 4,352,844 | 10/1982 | Bornstein | 428/35 |
| 4,361,237 | 11/1982 | Heiremans et al. | 206/631 |
| 4,501,780 | 2/1985 | Walters et al. | 428/35 |
| 4,505,970 | 3/1985 | Craver | 428/213 |
| 4,547,433 | 10/1985 | Ohya et al. | 428/516 |
| 4,680,340 | 7/1987 | Oreglia et al. | 525/72 |
| 4,737,391 | 4/1988 | Lustig et al. | 428/35 |
| 4,797,235 | 1/1989 | Garland et al. | 264/22 |
| 4,837,084 | 6/1989 | Warren | 428/349 |
| 4,853,265 | 8/1989 | Warren | 428/349 |
| 4,880,696 | 11/1989 | Yanidis | 428/349 |
| 4,997,690 | 3/1991 | Lustig et al. | 428/35.4 |
| 5,055,328 | 10/1991 | Evert et al. | 428/34.9 |
| 5,059,481 | 10/1991 | Lustig et al. | 428/39.9 |

FOREIGN PATENT DOCUMENTS

| | | |
|---|---|---|
| 982923 | 2/1976 | Canada . |
| 042831 | 8/1985 | European Pat. Off. . |
| 346944 | 12/1989 | European Pat. Off. . |
| 3744214 | 7/1989 | Germany . |
| 2094325 | 9/1982 | United Kingdom . |

OTHER PUBLICATIONS

Souheng Wu, "Polymer Interface and Adhesion," Chapt. 11, pp. 359–406, (Marcel Dekker, Inc., New York) (1982).

M. Bakker ed., "The Wiley Encyclopedia of Packaging Technology" pp. 458–461 and 523–526 (John Wiley & Sons, New York) (1986).

G. Haim et al, "Welding of Plastics" pp. 47–53 (C. Lockwood & Son, Ltd, London) (1947).

J.A. Neumann, "Welding of Plastics" pp. 110–127 (Reinhold Publishing Corp., New York) (1959).

R.S. Lenk, "Polymer Rheology" pp. 31–39 (Applied Science Publishers Ltd, London) (1978).

S.Y. Kienzie, "Polymer Blends and Alloys"pp. 1–3, (Technomic Publishing Co., Inc., Lancaster, PA) (1988).

"Encylopedia of Polymer Science and Engineering", vol. 14, pp. 466–468, 537–541 (J. Wiley & Sons, New York) (1988).

Salyer et al., "Controlled Stretching Upgrades EVA Films", *Plastics Engineering* pp. 39–44 (Feb., 1974).

Gregory, "EVA Shrink Films", *Plastics*, pp. 165–168 (Feb., 1969).

Jacobs et al., "VA–Modified Polyethylene Films", *Packaging Review*, pp. 13 and 15 (Nov. 1970).

"Adhesion and Bonding", *Encyclopedia of Polymer–Science and Engineering*, vo. 1, pp. 476–546 (John Wiley & Sons, 1985).

"Adhesive Compositions", *Encyclopedia of Polymer–Science and Engineering*, vol. 1, pp. 547–577 (John Wiley & Sons, (1985).

Adhesives Technology, S. S. Voyutskii, Apr., 1962 pp. 30–36 Diffusion and Self–Adhesion of the Polyimide PMDA–ODA, H.R. Brown et al, Oct., 1988, pp. 1807–1811. Reptation of Apolymer Chain in the Presence of Fixed Obstacles, J.C. Tully etal Jul., 1971, pp. 572–579.

The Healing Processs at Polymer–Polymer Interfaces, Stephen Prager, Nov., 1981, pp. 5195–5198.

Ethylene–Vinyl Acetate Copolymer Resin For Flexible Packagin, Dupont Company, Jan., 1982.

*Primary Examiner*—Charles Nold
*Attorney, Agent, or Firm*—Cedric M. Richeson

[57] ABSTRACT

A biaxially stretched, heat sealable, thermoplastic, flexible, food packaging film, preferably multilayer, having an outer heat sealable layer comprising an ethylene vinyl ester copolymer, preferably a blend of two different EVA copolymers wherein said heat sealing layer (which is preferably crosslinked by irradiation) has an $M_w$ of 50,000 or more, and an $M_n$ between 1000 and 18,000.

22 Claims, No Drawings

THERMOPLASTIC FILM INCORPORATING HIGH MELT INDEX RESINS

BACKGROUND OF THE INVENTION

The invention relates to thermoplastic flexible films having a heat sealable layer, and especially relates to multilayer films suitable for packaging fresh or frozen foods such as meat, poultry or cheese.

Food manufacturers and wholesalers utilize flexible thermoplastic food packaging films to provide economical, sanitary containers which help preserve the freshness and wholesomeness of their food products. These films are often sold to food processors in bag form. For example, a single or multilayer thermoplastic film may be made into bags by a food packaging manufacturer using film stock comprising a tubular film or one or more flat sheets or webs of film by well known processes involving e.g. cutting, folding and/or sealing the film to form bags which may then be shipped to processors for use in food packaging operations. These films and bags may be printed with customer logos, product data or other information and may also be uniaxially or biaxially oriented, heat shrinkable, or irradiated, or may contain film layers which are abuse resistant or puncture resistant, or which are crosslinked or which enhance or retard or prevent transmission of light, gases, or liquids therethrough. Frequently, multilayer films having one or more barrier layers to oxygen and/or moisture such as saran (a polyvinylidene chloride copolymer), a modified saran e.g. containing methyl acrylate polymer units, ethylene vinyl alcohol copolymer, nylon, or acrylonitrile may be used with a heat sealing layer such as a copolymer of ethylene and vinyl acetate (EVA) to produce bags for packaging fresh red meat. Such bags help preserve the meat in its original condition by preventing or reducing moisture loss and chemical changes in the meat structure due to oxidation reactions. A typical bag produced from a tubular film stock will have one or two sides which have been heat sealed by the bag manufacturer in the bag forming process. Such bags will have one open side to allow the food processor to insert the ham, turkey, chicken, cheese, primal or subprimal meat cuts, ground beef, fruits, vegetables, bread or other food products into the bag. The food processor then makes the final seal thereby enclosing the bag. This final seal may follow gas evacuation of the bag by vacuum means or replacement of the gaseous environment within the bag by a particular gas or mixture of gases which may be inert or reactive with the enclosed product to provide some advantage such as to assist product preservation. This final seal is frequently a heat seal similar to the initial seals produced by the bag manufacturer although the actual heat sealing equipment may vary.

Thus, commercially available bags are made by transversely sealing a tubular stock of either monolayer or multilayer film and cutting off the tube portion containing the sealed end, or by making two spaced apart transverse seals on a tubular stock and cutting open the side of the tube, or by superimposing flat sheets of film and sealing on three sides, or by folding flat sheets and sealing two sides.

Generally heat sealing of thermoplastic film is accomplished by applying sufficient heat and pressure to adjacent film layer surfaces for a sufficient time to cause a fusion bond between the layers.

A common type of seal used in manufacturing bags is known to those skilled in the art as a hot bar seal. In making a hot bar seal, adjacent thermoplastic layers are held together by opposing bars of which at least one is heated to cause the adjacent thermoplastic layers to fusion bond by application of heat and pressure across the area to be sealed. For example, bags may be manufactured from a tube stock by making one hot bar seal transverse to the tube. This seal may also be referred to as a bottom seal. Once the bottom seal is applied, the tube stock may be transversely cut to form the mouth of the bag.

The strength of seals of heat shrinkable bags may be measured by determining the time for a seal to fail when under certain conditions the seal is immersed in hot water at 95° C. i.e., the hot water seal strength ("HWSS") may be measured by a test such as that described as the "restrained shrinkage-seal strength test" in Funderburk et al U.S. Pat. No. 3,900,635 which patent is hereby incorporated by reference.

Once a food product such as meat or poultry is inserted into the bag, the package is typically evacuated and the bag mouth sealed. At one time, the standard method for sealing a bag was to fasten a clip around the mouth of the bag. More recently, heat sealing techniques have been employed to seal the bag. For example, a bag mouth may be hot bar sealed or it may be sealed by another common type of heat seal known as an impulse seal. An impulse seal is made by application of heat and pressure using opposing bars similar to the hot bar seal except that at least one of these bars has a covered wire or ribbon through which electric current is passed for a very brief time period (hence the name "impulse") to cause the adjacent film layers to fusion bond. Following the impulse of heat the bars are cooled (e.g. by circulating coolant) while continuing to hold the bag inner surfaces together to achieve adequate sealing strength.

Generally, impulse seals may be made faster than hot bar seals because of the quick cool down of the impulse ribbon following the heat impulse. Impulse seals are also generally narrower than hot bar seals which lead to an improved package appearance, but narrower seals also leave less margin for error in the production of continuous sealed edges. Since typically less area is bonded in an impulse seal relative to a hot bar seal, the performance of the sealing layer of the thermoplastic film is more critical.

One problem which occurs during impulse heat sealing of known films is that the film in the seal area often becomes extruded during sealing. This results in thinning of the film in the seal area and therefore reduces the strength of the film at the seal or in extreme situations, allows the thinned film to be too easily severed or pulled apart. Those skilled in the art refer to severely extruded seals as "burn through" seals. Thus, a "burn through" seal does not have adequate strength or integrity to seal in or protect the packaged product. One attempt to solve this "burn through" problem is to irradiate the film prior to manufacture of the bag.

Irradiation of a multilayer film causes the various irradiated layers in the film to crosslink. Under controlled conditions, crosslinking by irradiation raises and may also broaden the temperature range for heat sealing, and may also enhance the puncture resistance of the film.

Disadvantageously, the higher sealing range of crosslinked thermoplastic films causes food processors to heat seal their products at a higher temperature which may have a deleterious effect on their packaged product and which also results in higher energy costs. Also, if the heat sealing layer of the thermoplastic film is crosslinked too heavily, the highly crosslinked layer is more difficult to melt or fusion bond which makes it difficult to achieve strong seals, particularly by impulse sealing the bag mouths after filling with meat or poultry. All of the bag seals (including those made by both the bag manufacturers and the food processor and those made by whatever means including either or both hot bar seals and impulse seals) must maintain their integrity to preserve and protect the enclosed food product. There must be a strong continuous seal to prevent unwanted egress and ingress of gaseous, liquid or solid materials between the bag exterior and interior. This is particularly necessary when the food-containing package is made of heat shrinkable film and is to be immersed in hot water to shrink the film against the packaged food since such shrinkage increases the stress on these seals. Thus, there is a continuing need for monolayer and multilayer films which can be made into bags having strong seals especially when formed by hot bar sealing or impulse sealing. Such films should provide strong seals able to withstand a range of temperatures and also be able to produce such seals over a wide sealing temperature range without burn through.

Variations in sealing temperatures, times and pressure are known to exist not only from one brand and/or type of sealers to another but also between different sealing machines sold by the same manufacturer under the same brand identification. Such variations, which may be due to factors such as variation in the manufacturer's product or varying equipment settings or installation, increase the desirability for films which may be heat sealed to produce strong integral seals over a wide range of temperatures and therefore be usefully sealed on different sealing machines.

Another problem encountered during heat sealing is that of inadvertent folding. Normally, a heat seal is made by applying heat and pressure across two sheets or portions of film e.g. the two opposing sides of a flattened tube, however, occasionally the area to be sealed will be inadvertently folded to produce a section of film having four or six sheets or film portions which are pressed between the opposing sealer bars. In such situations it is desirable to be able to seal the film without burn through. A wider impulse heat sealing temperature range is indicative of a greater latitude in sealing through folds than a narrower range.

Copolymers of ethylene and vinyl esters such as vinyl acetate have previously been disclosed as useful materials in monolayer and multilayer thermoplastic films and are known for providing heat sealing properties.

For example, U.S. Pat. No. 3,365,520 (Foster et al) discloses use of blends of polymers such as EVA with ethylene/acrylic acid/sodium acrylate (EAA) interpolymers to form biaxially oriented films. Blends of EVAs having a melt index of 0.4 dg/min. with EAAs having a melt index of 1.6 are disclosed. Such blends are said to provide an improved ability to biaxially orient.

U.S. Pat. No. 3,707,590 (Wiggins et al) discloses an oriented multilayer film which may have a barrier layer of vinylidene chloride-vinyl chloride copolymer and a heat sealing layer of an ethylene-unsaturated ester type copolymer such as ethylene-vinyl acetate copolymer (EVA). Two or more layers may be coextruded and biaxially oriented in a tubular film orientation process and a three layer film of EVA/Saran/EVA is suggested.

Canadian Patent 982,923 (Lustig et al) discloses a biaxially stretched multilayer film of EVA/polyvinylidene chloride/EVA which is heat shrinkable and suitable for packaging primal meat cuts. The heat sealing layer utilizes an EVA (12 wt. % VA) having a melt index of 0.3. Blends of EVAs are also disclosed.

U.S. Pat. No. 3,817,821 (Gallini) discloses use of EVA blends in multilayer films useful as snack food packaging.

U.S. Pat. No. 4,082,877 (Shadle) discloses use of a blend of EVA elastomers each containing about 28 weight percent of vinyl acetate and having melt indices of 6 and 23 in a multilayer film.

U.S. Pat. No. 4,127,688 (Bieler et al) discloses EVA/Saran/EVA multilayer, heat shrinkable film where the heat sealing layer containing EVA has been irradiated to increase crosslinking.

U.S. Pat. No. 4,064,296 (Bornstein et al) discloses a heat shrinkable multilayer film having an oxygen barrier core layer of hydrolyzed ethylene-vinyl acetate (EVOH) and outer layers of EVA. Use of EVA blends of varying VA content in the heat sealing layer is also discussed.

U.S. Pat. No. 4,178,401 (Weinberg et al) discloses an oriented, heat shrinkable packaging film having a blended self-welding layer said to have superior seal strength and abuse resistance. Blends of EVAs with different melt flows are disclosed with e.g. a first EVA having a melt flow of less than 5.0 blended with a second EVA having a melt flow of at least 28. The film may also be crosslinked by irradiation.

U.S. Pat. No. 4,247,584 (Widiger et al) discloses heat sealable food bags made from multilayer films having a heat sealing layer comprising a blend of EVAs with 10 to 90 weight percent of the blend comprising a first EVA having 2–12% VA and a melt index of 0.2 to 10 dg/min. and 90 to 10 weight percent of the blend comprising a second EVA having 8–30% VA and a melt index of 0.2 to 5.

Past attempts at providing improved heat sealing in films, while making some progress, leave much to be desired. Variability in heat sealing equipment and process parameters continue to produce bags with weak seals which are subject to burn through, which fail to seal through folds, and which produce leaking bags having discontinuous seals. It would be highly desirable to have biaxially stretched, heat shrinkable films and bags whose heat sealing layer in particular and film construction in general allows greater flexibility and variability in heat sealing process parameters while producing strong, integral, continuous seals rapidly and with a lower failure rate relative to prior art films and bags.

SUMMARY OF THE INVENTION

According to the present invention, a novel biaxially stretched, heat sealable, thermoplastic flexible film comprising at least one outer heat sealable layer comprising a copolymer of ethylene and an unsaturated (preferably vinyl) ester wherein said outer heat sealable layer in general, and said copolymer in particular, has a weight average molecular weight ($M_w$) of 50,000 or more, and a number average molecular weight ($M_n$) between about 1,000 to 18,000. Advantageously, said outer heat sealable layer may comprise a blend of (a) a first copolymer of ethylene and a vinyl ester, and (b) a second different copolymer of ethylene and a vinyl ester, wherein said blend containing layer has a weight average molecular weight ($M_w$) of 50,000 or more, and a number average molecular weight ($M_n$) between about 1,000 to 18,000. Preferably, said $M_w$ and $M_n$ values are of said blend.

The preferred copolymers are of ethylene and vinyl acetate (EVA). Advantageously, a blend of a first EVA having a melt index between about 0.2 and 0.7 dg/min. with a second EVA having a melt index between about 1.0 (preferably 2.0) and 10 dg/min. is utilized and the blend containing layer is crosslinked, preferably by irradiation, to produce said $M_n$ and $M_w$ values. Beneficially, the present invention provides a heat sealing layer comprising a copolymer or blend of copolymers of ethylene and a vinyl ester, said copolymer and/or blend having a broadened molecular weight distribution which includes sufficient lower molecular weight species to enhance sealability especially through folds. Advantageously, the present invention produces bags less subject to seal failure relative to commercially available prior art films and may increase the impulse sealing temperature range.

DETAILED DESCRIPTION OF THE INVENTION

By the term "heat sealing layer" is meant a layer which is heat sealable to itself, i.e., capable of fusion bonding by conventional indirect heating means which generate sufficient heat on at least one film contact surface for conduction to the contiguous film contact surface and formation of a bond interface therebetween without loss of the film integrity. Advantageously, the bond interface must be sufficiently thermally stable to prevent gas or liquid leakage therethrough when exposed to above or below ambient temperatures during processing of food within the tube when sealed at both ends, i.e., in bag form. Finally, the bond interface between contiguous inner layers must have sufficient physical strength to withstand the tension resulting from stretching or shrinking due to the food body sealed within the tube.

As used herein, "antioxidant" means an additive which retards oxidation, i.e., cross-linking, of that layer on irradiation. The heat sealing layer of the present invention may utilize antioxidants to inhibit crosslinking as further taught by Evert et al, U.S. patent application 07/367,832 filed Jun. 16, 1989 whose teachings and description is hereby incorporated by reference.

Copolymers of ethylene and unsaturated esters having heat sealing properties may be employed in the heat sealing layer of the monolayer and multilayer films of the present invention. Suitable copolymers include ethylene-vinyl acetate, ethylene-vinyl proprionate, ethylene-methyl methacrylate, ethylene-ethyl methacrylate, ethylene-ethyl acrylate. Preferred copolymers are ethylene-vinyl esters such as ethylene-vinyl acetate, ethylene-vinyl formate, ethylene-vinyl proprionate, and ethylene-vinyl butylate. Especially preferred is ethylene-vinyl acetate (EVA).

Advantageously, the present invention utilizes a polymeric material in the heat sealing layer which has a broad molecular weight distribution and includes lower molecular weight species which are believed to enhance seal formation and strength. Beneficially, such polymeric material will have a weight average molecular weight ($M_w$) of at least 50,000 to provide sufficient film strength during orientation (especially during a double bubble type biaxial orientation process) and to resist "burn through" during heat sealing operations as described below. Also, such polymeric material will beneficially have a number average molecular weight ($M_n$) less than 20,000, preferably between about 1,000 and 18,000 $M_n$ and more preferably between about 5,000 and 18,000 $M_n$ and most preferably between 10,000 and 18,000, to provide sufficient polymeric material having chain lengths suitable for diffusion and entanglement between adjacent layers during heat sealing operations to form strong integral fusion bonds. At decreasing values of $M_n$, chain lengths become shorter. It is believed that at lower $M_n$ values e.g. below 5,000 and especially below 1,000, bonding and seal strength is reduced due to the high mobility of these very short polymer chains. At increasing values of $M_n$, chain lengths are longer and therefore less mobile during sealing. Therefore, $M_n$ values which are too high are indicative of materials which may have a limited ability to diffuse and entangle the polymer chains between adjacent layers thereby producing weaker layer to layer bonds with the possibility of little or no bonding at very high $M_n$ values. The greater the $M_n$ values exceed 18,000, the lesser the benefits (such as improved seal strengths and sealing range) of the present invention.

The dispersity of polymeric material utilized in the heat sealing layer may also be used to characterize the present invention which beneficially will have a polydispersity $M_w/M_n$ greater than 5, advantageously greater than 8 and preferably between about 8 to 15.

It will be appreciated by those skilled in the art that materials of broad molecular weight or materials which are polymodal in molecular weight distribution are contemplated, as are polymers, copolymers and/or polymeric blends.

It will be further appreciated that the above values for $M_w$ and $M_n$ may or may not be of the unaltered polymeric resins used to make the films, but preferably will be of the polymeric material which has been formed into film and most preferably those films which have been subjected to chemical or irradiative crosslinking. Preferably, a blend of copolymers will be used which blend is crosslinked to obtain the above disclosed $M_w$ and $M_n$ values.

Molecular weight distribution may be determined by those skilled in the art utilizing well known techniques of gel permeation chromatography as described below.

An advantage of the present invention is that use of the presently disclosed materials facilitates the utility of irradiation crosslinking in that the invention allows greater variation in application of radiation dosage with a reduced likelihood of excessive crosslinking relative to prior art films particularly those having heat sealing layers comprising narrow molecular weight polymeric material or material lacking an $M_n$ value or $M_w/M_n$ ratio as defined by the present invention.

Upon exposure to irradiation sufficient to cause crosslinking, heat sealable layers generally tend to diminish their heat sealing ability. However, an antioxidant may be added to the heat sealable inner layer of the tubular article as in Example 1 to inhibit cross-linking within the polymer, thereby reducing the adverse effects of radiation upon the heat sealing properties. Addition of an antioxidant further allows the irradiation dosage to be sufficiently high to allow other layers of the multilayer film to retain the beneficial effects of irradiation. Beneficially, films of the present invention may be crosslinked by use of chemical agents or by irradiation, preferably at a level between 1 and 10 Mrad, more preferably 2-4 Mrad.

The heat sealing layer of the present invention will preferably comprise a blend of at least two different copolymers of ethylene and at least one unsaturated ester. Most preferred are vinyl ester copolymers of ethylene and especially preferred are the ethylene-vinyl acetate (EVA) copolymers. Many different EVA resins are commercially available having a wide range of vinyl acetate contents and melt flow indices.

For the present invention, it is preferred that the heat sealing layer comprise a blend of a first copolymer of ethylene and a vinyl ester and a second copolymer of ethylene and a vinyl ester with at least one of said copolymers having a melt index (M.I.) between about 0.2 and 0.7 dg/min. as measured by ASTM D-1238, at 190° C. under a total load of 2.16 Kg (condition E). It is preferred that the copolymer or copolymers having an M.I. between about 0.2 and 0.7 dg/min. be the major constituent(s) of the blend with at least 50 weight percent of the blend being especially preferred. It is also preferred that one of the blend copolymer of ethylene and a vinyl ester have a melt index greater than 1 preferably greater than 2 dg/min. and more preferably be from about 2.0 to about 10 dg/min. It is preferred that the copolymer or copolymers having an M.I. of greater than 1 dg/min. (preferably 2 dg/min.) be a minor component of the blend. It is especially preferred to use a first copolymer having an M.I. between about 0.2 and 0.7 dg/min as a major blend constituent with a minor constituent of a second copolymer having an M.I. between about 2.0 and 10 dg/min.; most preferably such first and second copolymers will be EVAs.

Suitable vinyl ester content of the copolymers used in the present invention include 4–28 weight percent vinyl ester based on the total copolymer weight.

A most preferred EVA blend of the present invention comprises a first copolymer of ethylene and vinyl acetate such as that sold by the Union Carbide Corporation of Danbury, Conn. under the brand designation DQDA 6833 with the following reported properties, a density of 0.933 g/cm$^3$, a vinyl acetate content of 10 wt. %, and a melt index of about 0.25 dg/min.; and a second copolymer of ethylene and vinyl acetate such as that sold by the DuPont Company of Wilmington, Del. under the trademark ELVAX 3128 with the following reported properties, a density of 0.93 g/cm$^3$, a vinyl acetate content of 8 9 wt. % and a melt index of 2.0 dg/min. ELVAX 3128 is further described in a 2 page product brochure E-37418 (1/82) entitled "3128" whose teachings which are hereby incorporated by reference. It should be noted that the above reported melt indices are initial values for the pelletized resins as received by the manufacturer. Crosslinking, especially irradiative crosslinking, is known to increase the average molecular weight by formation of longer chains of molecules than originally present. Therefore, crosslinking will also reduce the melt index from its initial value to a lower value since the melt index is not only a measure of viscosity but also an indirect measure of molecular weight. Also, the melt blended material will also have its own melt index which is not to be confused with that of the original copolymer components of the blend.

As generally recognized in the art, resin properties may be further modified by blending two or more resins together and it is contemplated that the ethylene-unsaturated ester copolymer resins, especially vinyl ester copolymers such as EVAs as described above may be blended with other resins such as very low density polyethylene (VLDPE), linear low density polyethylene (LLDPE), low density polyethylene (LDPE), high density polyethylene (HDPE), ionomers, polypropylene or other esters. These resins and others may be mixed by well known methods using commercially available tumblers, mixers or blenders. Also, if desired, well known additives such as processing aids, slip agents, antiblocking agents, pigments, etc., and mixtures thereof may be incorporated into the film.

In a preferred process for making films of the present invention, the resins and any additives are introduced to an extruder (generally one extruder per layer) where the resins are melt plastified by heating and then transferred to an extrusion (or coextrusion) die for formation into a tube. Extruder and die temperatures will generally depend upon the particular resin or resin containing mixtures being processed and suitable temperature ranges for commercially available resins are generally known in the art, or are provided in technical bulletins made available by resin manufacturers. Processing temperatures may vary depending upon other process parameters chosen. For example, according to the present invention, in extrusion or coextrusion of the ethylene-unsaturated esters and especially vinyl ester copolymers such as EVA blends, barrel and die temperatures may range between about 145° C. and 170° C. However, variations are expected which may depend upon such factors as variation of polymer resin selection, use of other resins e.g. by blending or in separate layers in a multilayer film, the manufacturing process used and particular equipment and other process parameters utilized. Actual process parameters including process temperatures are expected to be set by one skilled in the art without undue experimentation.

In a preferred extrusion double bubble process of the type described in U.S. Pat. No. 3,456,044 the primary tube leaving the die is inflated by admission of air, cooled, collapsed, and then preferably oriented by reinflating to form a secondary bubble with reheating to the film's orientation (draw) temperature range. Machine direction (M.D.) orientation is produced by pulling or drawing the film tube e.g. by utilizing pairs of rollers travelling at different speeds and transverse direction (T.D.) orientation is obtained by radial bubble expansion. The oriented film is set by rapid cooling. Suitable machine direction and transverse direction stretch ratios are from about 3:1 to about 5:1 with a ratio of about 4:1 preferred.

Films of the present invention may be monolayer or multilayer films preferably of 10 mils or less. Multilayer films have the following preferred layer thicknesses. The thickness of the heat sealable inner thermoplastic first layer is preferably between about 0.5 and about 2.0 mils. Thinner layers may not perform the aforedescribed functions while thicker layers do not appreciably improve processability of the film and may reduce total film performance. Accordingly, they would be uneconomical.

The barrier layer thickness is preferably between about 0.1 and about 0.5 mils. Thinner barrier layers may not perform the intended functions and thicker layers do not appreciably improve performance.

In the barrier layer embodiment of this invention the outer thermoplastic layer of the enclosing multilayer film is on the opposite side of the core layer from the inner layer, and in the preferred three layer embodiment this outer layer is both directly adhered to the core layer and in direct contact with the environment. Since it is seen by the user consumer, it must enhance optical properties of the film. Also, it must withstand contact with sharp objects and so is termed the abuse layer and provides abrasion resistance.

The outer layer is preferably formed of ethylene vinyl acetate as at least the major constituent, more preferably at 50% weight percent EVA and most preferably at least 70 weight percent EVA. Also, the outer layer preferably has between about 3% and about 18% vinyl acetate content to provide good shrinkability.

Alternatively, the outer layer may be formed of other thermoplastic materials as for example polypropylene, ethylene—propylene copolymer, ionomer, or an alpha olefin and in particular a member of the polyethylene family such as linear low density polyethylene (LLDPE), very low density polyethylene (VLDPE and ULDPE), respectively, or blends of these materials.

The thermoplastic outer layer thickness is preferably between about 0.5 and 1.0 mils. Thinner layers may be less effective in performing the abuse resistance function, while thicker layers may reduce film stretchability.

The following physical properties are used to describe the present film and seals and are measured in the described manner.

Dynamic Puncture Resistance

The dynamic puncture resistance procedure is used to compare films for their resistance to bone puncture. It measures the energy required to puncture a test sample with a sharp pyramidal metal point made to simulate a sharp bone end. A Dynamic Ball Burst Tester, Model No. 13-8, available from Testing Machines, Inc., Amityville, Long Island, N.Y., is used, and a modified tip is installed on the tester probe arm for use in this test procedure. The modified tip is constructed from a ⅜ inch (0.95 cm) diameter conical tip having a configuration of a right circular cone with the angle between the cone axis and an element of the conical surface at the vertex being about 65°. Three equally spaced and abutting planar surfaces are machined to a smooth finish on the cone surface to form a pyramidal shaped point. At least six test specimens approximately 4 inches (10 cm) square are prepared, a sample is placed in the sample holder, and the pendulum is released. The puncture energy reading is recorded. The test is repeated until at least 6 samples have been evaluated. The results are calculated in cm-kg per mil of film thickness and are averaged.

Shrinkage

The biaxially stretched films of the present invention are heat shrinkable. Biaxially stretched films are "heat shrinkable" as that term is used herein, if the film has an unrestrained shrinkage of at least 5 percent in two directions.

Shrinkage values are obtained by measuring unrestrained shrink of the stretched film at 90° C. for five seconds. Four test specimens are cut from a given sample of the oriented film to be tested. The specimens are cut to 10 cm. in the machine direction by 10 cm. in the transverse direction. Each specimen is completely immersed for 5 seconds in a 90° C. water bath. The distance between the ends of the shrunken specimen is measured. The difference in the measured distance for the shrunken specimen and the original 10 cm. is multiplied by ten to obtain the percent of shrinkage for the specimen. The shrinkage for the four specimens is averaged for the MD shrinkage values of the given film sample, and the shrinkage for the four specimens is averaged for the TD shrinkage value.

Shrink Force

The shrink force of a film is that force or stress required to prevent shrinkage of the film and was determined from film samples taken from each film. Four film samples were cut 1" (2.54 cm) wide by 7" (17.8 cm) long in the machine direction and 1" (2.54 cm) wide by 7" (17.8 cm) long in the transverse direction. The average thickness of the film samples was determined and recorded and a strip chart recorder was calibrated at 0 gram and at 1,000 grams full scale load. Each film sample was then secured between two clamps spaced 10 cm apart. One clamp is in a fixed position and the other is connected to a strain gauge transducer. The secured film sample and clamps were then immersed in a silicone oil bath maintained at a constant, elevated temperature for a period of five seconds. During this time, the force in grams at the elevated temperature was read from the strip chart and this reading was recorded. At the end of this time, the film sample was removed from the bath and allowed to cool to room temperature whereupon the force in grams at room temperature was also read from the strip chart and recorded. The shrink force for the film sample was then determined from the following equation wherein the result is obtained in grams per mil of film thickness (g/mil):

$$\text{Shrink Force (g/mil)} = F/T$$

wherein F is the force in grams and T is the average thickness of the film samples in mils.

Sealing Range

The impulse sealing range test is a test conducted to determine and compare the acceptable voltage ranges for impulse sealing plastic films. A Sentinel Model 12-12AS laboratory sealer manufactured by Packaging Industries Group, Inc., Hyannis Mass. was used. This impulse sealer is equipped with a replacement sealing ribbon for a Multivac AG100. The ribbon is available from Koch Supplies of Kansas City, Mo. In this test, two four inch wide (T.D. direction) samples are cut from a tubular film. The impulse sealer is equipped with controls for coolant flow, impulse voltage and time, and seal bar pressure. These controls except for impulse voltage are set at the following conditions:

0.5 seconds impulse time (upper ribbon only)
2.2 seconds cooling time
50 psi (345 kPa) jaw pressure
0.3 gallon per minute (1 liter per minute) of cooling (about 75° F. (22° C.)) water flow One of the samples is folded in half for use in determining a minimum sealing voltage. This folding simulates folding which may inadvertently occur during conventional bag sealing operations. The folded sample which now has four sheets or portions of film (hereinafter referred to as "sheet portions") is placed into the sealer and by trial and error the minimum voltage to seal the bottom two sheet portions to each other was determined.

The maximum voltage is then determined for a sample having two sheet portions by placing it in the sealer and then activating the seal bar. The film sample is manually pulled with about 0.5 lbs. of force and the voltage which does not cause burn through or significant distortion of the seal is determined.

Hot Water Seal Strength

In commercial use food packaging bags are filled with food product, as for example poultry, evacuated through the mouth end of the bag and sealed, as for example, by an impulse sealing machine. The seal strength of the sealed test bags is determined by a Hot Water Seal Strength (HWSS) test designed to simulate a poultry packaging application. A metal frame fabricated from wire is employed in this test to simulate the contours of poultry to be packaged, and the frame is placed inside the test bag. The so-opened bag and test frame is then immersed in water at 95° C.±0.5° C. with the seals at the bottom end, and the time to failure of the seal was measured. This procedure for measuring HWSS is described more completely in the previously mentioned Funderburk et al U.S. Pat. No. 3,900,635, incorporated herein by reference.

The following are examples and comparative examples given to illustrate the present invention.

In all the following examples, unless otherwise indicated herein the film compositions were produced generally utilizing the apparatus and method described in U.S. Pat. No. 3,456,044 (Pahlke) (hereby incorporated by reference) which describes an extrusion type of double bubble method and in further accordance with the detailed description above. In all the examples below, unless otherwise noted, the extruded primary tube was biaxially oriented following the Pahlke method and wound on a reel. Those skilled in the art of manufacturing biaxially oriented films know of different and various processes for such manufacture and the present inventive films include biaxially oriented or stretched films regardless of the method used for their production. All percentages are by weight unless indicated otherwise.

Unless otherwise noted, the physical properties reported in the examples below were measured by either the test procedures described above or tests similar to the following methods.

Average Gauge: ASTM D-2103

Tensile Strength: ASTM D-882, method A

Secant Modulus: ASTM D-882, method A

Percent Elongation: ASTM D-882, method A

Molecular Weight Distribution: Gel permeation chromatography

Gloss: ASTM D-2457, 45° Angle

Haze: ASTM D-1003-52

Melt Index: ASTM D-1238, Condition E

Melt Flow Index: ASTM D-1238, Condition F

Melting Point: ASTM D-3418, DSC with 5° C./min. heating rate.

Vicat Softening Point: ASTM D-1525-82

All ASTM test methods noted herein are incorporated by reference into this disclosure.

EXAMPLES 1–5

In Examples 1–5, four biaxially stretched, heat shrinkable, multilayer films of the present invention were made and physical properties of the films tested. Example 5 is a similarly made biaxially stretched, heat shrinkable, multilayer film not of the invention which is presented as a comparative example. The layers of each multilayer film were coextruded and biaxially stretched according to a coextrusion type of double bubble process such as that described in U.S. Pat. No. 3,456,044 (Pahlke) which is hereby incorporated by reference, and as further described below.

Examples 1–5 are three layered films. However, multilayered films of two or four or more layers are contemplated by the present invention. The inventive multilayer films may include tie or adhesive layers as well as layers to add or modify various properties of the desired film such as heat sealability, toughness, abrasion resistance, tear resistance, puncture resistance, optical properties, gas or water barrier properties, shrinkability, and printability. These layers may be formed by any suitable method including coextrusion, extrusion coating, and lamination.

For Examples 1–5, one extruder was used for each layer and the heat plastified resins from each extruder were introduced to a coextrusion die from which the resins were coextruded at a first outer: core: second outer layer ratio of about 10:2:5.

For each layer, the resin or resin mixture and any additives were fed from a hopper into an attached standard single screw extruder where the resin and/or mixture was heat plastified and extruded through a coextrusion die into a primary tube. The extruder barrel temperatures for the core layer ranged from about 255° to 295° F. (124°–146° C.) and for the second outer layer ranged from about 310° to 330° F. (154°–166° C.) and for the first outer layer ranged from about 295° to 305° F. (146°–152° C.). The coextrusion die temperature profile was set at about 320° F. (160° C.) to about 345° F. (174° C.). The extruded multilayer primary tube was then cooled, reheated, biaxially stretched, and cooled according to a double bubble process and the resultant biaxially stretched film wound on a reel. The machine direction (M.D.) draw or orientation ratio was about 4.5:1 and the transverse direction (T.D.) bubble or orientation ratio was about 3.8:1 for all the films. The draw point or orientation temperature is below the melting point for each layer to be oriented and above that layer's vicat softening point. The draw point temperature of these multilayer films 1–5 is believed to have been about 170° F. (77° C.). Draw point temperature, bubble cooling rates and orientation ratios are generally adjusted to maximize bubble stability.

All of the film samples were crosslinked by irradiation at a level of 3 megarads (Mrad) after biaxial stretching (which irradiative process is hereinafter referred to as post-irradiation), in the manner generally described in Lustig et al, U.S. Patent No. 4,737,391 which is hereby incorporated by reference. Those skilled in the art of manufacturing biaxially oriented films know of different and various processes of such manufacture and the present inventive films include biaxially oriented or biaxially stretched films regardless of the method used for their production.

The average gauge and other physical properties were measured and are reported in Table 1. For all the Examples 1–5, the core layer comprised a 3:1 blend of commercially available vinylidene chloride-methylacrylate copolymer and vinylidene chloride-vinyl chloride copolymer. For Examples 1–3, the second outer layer comprised a commercially available ethylene vinyl acetate copolymer (EVA) (10% vinyl acetate), and 1.5 wt. % of a 1.7 wt. % fluorocarbon elastomer in a LLDPE base processing aid such as that sold by U.S.I. under the brand name Spectratech 11607. For Examples 4 and 5, the second outer layer comprised a 3:1 blend of a first EVA (12% vinyl acetate content) with a second EVA (4.5% vinyl acetate content).

The heat sealing layer was the first outer layer of the multilayer film and the inner layer of the film tube. For Examples 1–4 of the invention this heat sealing layer comprised a first copolymer of ethylene and vinyl acetate (EVA) having a vinyl acetate (VA) content of 10% by weight (based on the weight of the first copolymer), a density of 0.933 g/cm$^3$ and a melt index of 0.25, blended with a second EVA having a VA content of 8.9 wt. % (based on the total weight of the second copolymer) and a melt index of 2.0 dg/min. The above blend was utilized in the heat sealing layer in Examples 1–4 and is according to the present invention. In Comparative Example 5, the heat sealing layer comprises substantially 100% of the first EVA copolymer described below. The first EVA copolymer used was a commercially available pelletized resin sold by the Union Carbide Corporation of Danbury, Conn. under the trademark DQDA 6833, while the second EVA copolymer is a commercially available pelletized resin sold by the DuPont Company of Wilmington, Del. under the trademark ELVAX 3128.

For Examples 1, 2 and 4, the inner layer EVA copolymer blend comprised a 3:1 weight ratio of the first EVA copolymer to the second EVA copolymer. In Example 1, 800 ppm of an antioxidant, butylated hydroxytoluene (BHT) was added to the 3:1 EVA blend. In Example 3, the heat sealing layer comprised a blend of 75 weight percent of the first EVA copolymer, 15 weight percent of the second EVA copolymer and 10 weight percent of a very low density polyethylene (VLDPE). The VLDPE used was a commercially available copolymer of ethylene and 1-octene which is available from the Dow Chemical Company of Midland, Mich. under the trademark Attane 4001.

In another aspect of the invention, one or more layers having gas barrier properties may be incorporated into a multilayer film as either an intermediate or surface layer or both. For example, ethylene vinyl alcohol copolymer (EVOH), vinylidene chloride-methylacrylate copolymer, nylon such as nylon 6 or amorphous nylon, vinylidene chloride-vinyl chloride copolymer, acrylonitriles were other materials having oxygen barrier properties may be used in one or more layers such as the core layer. Blends of resins having gas barrier properties may also be used e.g. a blend of nylon with EVOH.

The multilayer films of Examples 1–5 were irradiated after orientation with 3.0 Mrad by electron beam according to methods well known in the art.

Physical properties of the irradiated multilayer films were tested and are reported in Table 1.

Additionally, molecular weight determinations were made for the heat sealing layers of Examples 2, 3 and 5. Example 2 had an $M_w$ of 144,300 and an $M_n$ of 17,370 and Example 3 had an $M_w$ of 146,800 and an $M_n$ of 17,430. Similar values are expected for Examples 1 and 4 of the invention. These values may be compared to Example 5 which is a control film having a heat sealing layer of film (not of the present invention) which was comprised of about 100 weight percent of the first EVA copolymer. This control film was similarly manufactured including orientation by the double bubble process and irradiation at 3.0 Mrad. The irradiated control film had an $M_w$ of 165,400 and an $M_n$ of 26,900. The $M_w$ and $M_n$ values for the heat sealing layer of two commercially available prior art biaxially stretched, heat sealable, multilayer flexible films (designation "A" & "B") were also measured. The heat sealing layer of Film A was believed to be comprised of irradiatively crosslinked EVA copolymer and had an $M_w$ of 91,470 and an $M_n$ value of 19,870. The heat sealing layer of Film B was believed to be comprised of a crosslinked blend of EVA copolymer and a VLDPE and had an $M_w$ of 133,200 and an $M_n$ of 20,040. The $M_w$ and $M_n$ values were measured by the well known method of gel permeation chromatography. From the above $M_w$ and $M_n$ values, the polydispersity or $M_w/M_n$ ratio may be calculated. The dispersity values for examples 2, 3, 5 and Film A and Film B are 8.3, 8.4, 6.1, 4.6 and 6.6 respectively.

As shown above, the dispersity values for the inventive film are higher than those values for comparative example 5 and prior art films A and B. Furthermore the $M_n$ values for films of the invention are lower than those $M_n$ values for comparative example 5 and A and B. Also, the $M_w$ of the inventive films is higher than the $M_w$ of films A and B. The above $M_w$ and $M_n$ and dispersity values demonstrate that heat sealing layers of the present invention have a broader molecular weight distribution with a higher amount of lower molecular weight species than the comparative example and the prior art films A and B.

Referring now to Table 1, Comparative Example 5 presents physical property values which are acceptable for food packaging film which are commercially useful for packaging processed meats. Examples 1–4 of the present invention all have comparable or better values for shrink, shrink force and tensile strengths relative to Comparative Example 5 for multilayer films of substantially the same gauge thickness. Multilayer films of the present invention demonstrate excellent elongation at break values and 1% secant modulus values relative to the film of Comparative Example 5. The gloss of the inventive films was good though less than Comparative Example 5. Haze was also tested with films of Examples 1–5 have respective % values of 5.6, 6.6, 5.7, 5.6 and 5.5. Therefore, Examples 1, 3, and 4 of the present invention have comparative haze percentages relative to the control film. All optical properties were of wiped film to remove any surface particles on the film surfaces. Generally, the optical values are very good and commercially acceptable. The tear strength of the invention films is also good. All films of the inventive processed well with no noticable gels or melt fracture and the primary tubes were easier to extrude compared to the control film of Example 5.

The films of the present invention have desirable sealing properties. The impulse seal range test demonstrates that Examples 2, 3 and 4 all have a sealing range which is 7–13% broader than that of the control. The 1 and 2 volt differences in sealing range values are significant and are believed to translate into broader ranges for many commercially available sealers other than the Sentinel.

The hot water seal strength test (HWSS) was also conducted about twenty minutes after final seal formation with Examples 1–3 and 5 having respective test times in seconds of 24.2, 19.3, 16.5 and 9.5. The films of the present invention have excellent hot water seal strength relative to the control film of Example 5. The comparative film of Example 5 had a HWSS value of less than 10 seconds, while all of the inventive films tested were above 15 seconds. The inventive films of Examples 1 and 2 had times double or more of that of the control. The HWSS of Example 4 was not tested, but is believed to be comparable to the values obtained for Examples 1–3.

In two separate tests, bags formed from the films of Examples 3, 4 and 5 were used to package ham portions (butts and/or shanks) and sealed with Cryovac impulse sealing machines. During the sealing operation, air was evacuated from the ham containing bag and the evacuated bag was temporarily sealed by mechanically clamping near the mouth end and then spaced inwardly from the clamp the bag was impulse sealed. The excess film was severed from the sealed bag by a knife cutting across the mouth end between the impulse seal and the clamp. Leakage was determined by visual inspection of the packaged meat. After the packaged product emerged from the shrink tunnel those packages that had a loose film appearance and/or bulges were removed. Packages with a good vacuum closely follow the contour of the meat. These bags are inflated by puncturing the film with a stainless steel needle through which sufficient air is added to expand the bag so that it has enough air to allow determination of leaks by submersion of the bag in a tank of water followed by visual inspection for air bubbles. Care is taken not to admit so much air as to stress the bags and its seals.

In the first test under severe conditions, 4 of 21 bags (19%) made from the film of Example 3 were leakers, while 3 of 22 (14%) of Example 4 bags were leakers, and 6 of 19 (32%) of the comparative film of Example 5 were leakers.

In the second test, 14 bags each of Example 3, 4 and 5 were tested with all 28 bags of Examples 3 and 4 of the invention sealing properly. One of the control bags (7%) was a leaker. Thus, the bagging tests demonstrate the superior sealing ability of the heat sealing layer and the multilayer films according to the present invention.

The above tests for leakers, HWSS, and impulse seal range demonstrate that films having a heat sealing layer which according to the present invention produces better seals. These seals are stronger, and less subject to failure due to variations in heat sealing process parameters and equipment.

EXAMPLES 6–8

Examples 6–7 are monolayer films made according to the present invention. Example 8 is a monolayer film comparative example not of this invention. Films 6–8 were all made according to the procedures described above (except as noted below) for multilayer film including orientation according to the double bubble process followed by irradiation at 3.0 Mrad. The barrel temperature profile of the single extruder needed for the monolayer film was set between about 330°–335° F. (166°–168° C.) as was the die temperature profile. The M.D. and T.D. orientation ratios were between about 3.3:1 to 3.6:1.

The film of Example 6 was a 3:1 blend of a first EVA copolymer with a second EVA copolymer similar to that used for the first outer layer of Example 2.

The film of Example 7 was a 3:1 blend of the first EVA copolymer used in Examples 2 and 6 and a second EVA copolymer which comprised an EVA copolymer (9% VA) having a melt index of 8.0 dg/min. such as a commercially available EVA copolymer from the DuPont Company under the name ELVAX 3124.

The film of Example 8 was a control film (not of the invention) which comprised 100% of the first EVA copolymer of Examples 2, 5, 6 and 7.

The films all processed well and extruded easily with no noticably gels or melt fracture. Physical properties of Example 6 were measured and the film had a shrinkage value of 27/40% (M.D./T.D.), a dynamic puncture of 2.9 cmkg/mil, an M.D./T.D. X $10^3$ p.s.i. secant modulus at 1% of 16.8/17.5 (115/121 MPa), an M.D./T.D. psi tensile strength of 9.5/7.9 (66/54 MPa), and an elongation at break of 230/245. These properties evidence a strong, heat shrinkable, orientation film with many useful properties. The impulse sealing range of the film of Examples 6 and 8 was measured and compared. Examples 6 had a minimum/maximum range of 25–46.5 volts, while the control film of Example 8 had a much narrower range of 27–44 volts. Thus, an approximately 25% improvement in sealing range was obtained for the film of the invention relative to the control.

While this invention has been described with reference to certain specific embodiments, it will be recognized by those skilled in the art that many variations are possible without departing from the scope and spirit of the invention.

What is claimed is:

1. A biaxially stretched, heat sealable, thermoplastic flexible film comprising at least one outer heat sealable layer comprising a blend of (a) first copolymer of ethylene and a vinyl ester wherein said first copolymer has a melt index between about 0.2 and 0.7 dg/min as measured by ASTM D-1238, condition E, and (b) a second different copolymer of ethylene and a vinyl ester wherein said second copolymer has a melt index between about 2 and 10 dg/min as measured by ASTM D-1238, condition E, and wherein said blend containing layer has a weight average molecular weight ($M_w$) of 50,000 or greater, and number average molecular weight ($M_n$) between about 1,000 to 18,000.

2. A film, as defined in claim 1, wherein said blend has been crosslinked and said crosslinked blend has said $M_w$ and $M_n$ values.

3. A film, as defined in claim 1, further comprising at least one other thermoplastic layer.

4. A film, as defined in claim 1, wherein said first copolymer is of ethylene and a vinyl acetate.

5. A film, as defined in claim 1, wherein both said first and said second copolymers are different copolymers of ethylene and vinyl acetate.

6. A film as defined in claim 1, wherein said first copolymer has a melt index between about 0.2 and 0.6 dg/min. as measured by ASTM D-1238, condition E.

7. A film, as defined in claim 2, wherein said blend containing layer has been irradiatively crosslinked.

8. A film, as defined in claim 1, further comprising at least one additional thermoplastic layer and wherein said first and said second copolymers are EVA copolymers, said first copolymer having an initial melt index between about 0.2 and 0.7 dg/min. and a vinyl acetate content between about 4 and 28 wt. % of the total first EVA copolymer weight, said second copolymer having an initial melt index between about 2 and 10 dg/min. and a vinyl acetate content between about 4 and 28 weight percent based on the total second EVA copolymer weight said melt indices being defined by ASTM D-1238, Condition E, and said heat sealable layer blend

TABLE 1

| # | AVG. GAUGE mil (micron) | IMPULSE SEAL RANGE (VOLTS) MIN-MAX | Elmendorf tear strength gm/mil (Kg/cm) M.D./T.D. | SHRINK at 90° C. % M.D./T.D. | SHRINK FORCE at 90° C. gm/mil (Kg/cm) M.D./T.D. | SHRINK FORCE at RT gm/mil (Kg/cm) M.D./T.D. | Tensile Strength × $10^3$ psi (MPa) at RT M.D./T.D. | Secant Modulus at 1% × $10^3$ psi (MPa) M.D./T.D. | Elongation at break % at RT M.D./T.D. | GLOSS at 45° Angle |
|---|---|---|---|---|---|---|---|---|---|---|
| 1* | 1.71 (43) | 29–43 | 26/32 (10/13) | 43/50 | 145/135 (57/53) | 45/60 (18/24) | 11.1/13.2 (77/91) | 29.0/40.5 (200/279) | 150/195 | 76 |
| 2 | 1.84 (47) | 28–44 | 52/26 (20/10) | 43/50 | 155/120 (61/47) | 50/55 (20/22) | 11.5/12.7 (79/88) | 33.0/33.0 (220/228) | 170/200 | 75 |
| 3** | 1.92 (49) | 29–45 | 21/23 (8.3/9.1) | 42/48 | 160/135 (63/53) | 60/60 (24/24) | 11.5/12.8 (79/88) | N/T | 160/190 | 74 |
| 4*** | 1.93 (49) | 28–43 | 46/36 (18/14) | 44/50 | 170/125 (67/49) | 55/55 (22/22) | 10.8/12.1 (74/83) | N/T | 170/190 | 76 |
| 5**** | 1.95+ (50) | 30–44 | N/T | 42/51 | 130/145+ (51/57) | 45/55+ (18/22) | 12.0/12.4+ (83/85) | 24/27+ (170/190) | 145/160+ | 83 |

RT - Room Temperature
N/T-Not Tested
All examples are three layer films having similar core layers of a 3:1 blend of commercially available vinylidene chloride-methylacrylate copolymer and vinylidene chloride-vinyl chloride copolymer. The second outer layer for Examples 1–3 all comprise commercially available EVA having a 10% VA-content.
*The first outer layer (inner layer of tube) contains 800 ppm of an antioxidant comprising butylated hydroxytoluene (BHT).
**The first outer layer (inner layer of tube) contains 10% by weight of an ethylene 1-octene VLDPE copolymer.
***The second outer layer contains a blend of EVAs.
****Control film (not of the invention). The first outer layer comprises about 100% of the first EVA copolymer of Examples 1–4; core layer is the same as for examples 1–4; the second outer layer is the same as that for Example 4.
+This control film was not tested for these values which are instead typical values for a similarly made film of the same composition and structure.

having sufficient crosslinked bonds to provide an inner layer $M_w$ of at least 50,000 and a inner layer $M_n$ of from 5,000 to 18,000.

9. A film, as defined in claim 1, wherein said outer heat sealable layer is the innermost layer of a tube formed of said film.

10. A film, as defined in claim 1, wherein said film is fabricated into bags.

11. A biaxially stretched film comprising: a heat sealing layer comprising a blend of a first copolymer of ethylene and vinyl acetate having a vinyl acetate content between 4 and 18 weight percent of the total first copolymer weight and a melt index between about 0.1 and 0.7 dg/min. as measured by ASTM D-1238, Condition E; and a second copolymer of ethylene and vinyl acetate having a vinyl acetate content between about 4 and 18 weight percent of the total second copolymer weight and a melt index between about 2 and 10 dg/min. as measured by ASTM D-1238, Condition E.

12. A film, as defined in claim 1, wherein said blend of said first and second copolymer has a weight ratio of first copolymer to second copolymer of about 9:1 to 1:1.

13. A film, as defined in claim 11, further comprising at least one additional thermoplastic layer.

14. A film, as defined in claim 13, wherein said additional layer comprises a gas barrier layer having an oxygen transmission of less than 15 cc/100 in$^2$ for 24 hrs. at 1 atm.

15. A film, as defined in claim 11, wherein said film is a tubular multilayer film formed by coextrusion or coating lamination and said heat sealing layer is the innermost layer of said tube.

16. A film, as defined in claim 11, wherein said heat sealing layer comprises a material having an $M_w/M_n$ dispersity between 5 to 15.

17. A film, as defined in claim 11, which has a shrinkage value of at least 30% in at least one direction.

18. A film, as defined in claim 11, wherein said heat sealing layer further comprises an antioxidant.

19. A film, as defined in claim 11, wherein said blend of said first and second ethylene vinyl acetate copolymers comprises at least 50 percent by weight of said heat sealing layer.

20. A film, as defined in claim 15, wherein said film comprises an outermost layer comprising at least 50 percent by weight of copolymer of ethylene with at least one alpha-olefin or at least one vinyl ester or blends thereof, and said film further comprises a core layer between said outermost layer and said innermost layer, said core layer comprising a vinylidene chloride copolymer, a nylon or a copolymer of ethylene with a vinyl alcohol.

21. A film, as defined in claim 1, wherein said heat sealable layer has a thickness between about 0.5 to 2.0 mils (13–51 microns).

22. A film, as defined in claim 11, wherein said heat sealing layer has a thickness between about 0.5 to 2.0 mils (13–51 microns).

* * * * *